(12) United States Patent
Minami

(10) Patent No.: US 6,985,804 B2
(45) Date of Patent: Jan. 10, 2006

(54) EVALUATION SYSTEM FOR VEHICLE OPERATING CONDITIONS

(75) Inventor: Katsuaki Minami, Nagano (JP)

(73) Assignee: Miyama, Inc., Nagano (JP)

(\*) Notice: Subject to any disclaimer, the term of this patent is extended or adjusted under 35 U.S.C. 154(b) by 60 days.

(21) Appl. No.: 10/626,632

(22) Filed: Jul. 25, 2003

(65) Prior Publication Data

US 2004/0148084 A1    Jul. 29, 2004

(30) Foreign Application Priority Data

Jul. 30, 2002    (JP)    ............................... 2002-220707

(51) Int. Cl.
*G01F 9/00*    (2006.01)
(52) U.S. Cl. ........................ 701/64; 701/123; 340/439
(58) Field of Classification Search ............... 701/1, 701/123, 64, 51; 340/438, 439
See application file for complete search history.

(56) References Cited

U.S. PATENT DOCUMENTS

| | | | |
|---|---|---|---|
| 4,411,174 A | * | 10/1983 | Yokoi et al. .................... 477/62 |
| 4,475,380 A | * | 10/1984 | Colovas et al. ................ 73/114 |
| 4,492,112 A | * | 1/1985 | Igarashi et al. ............. 73/117.3 |
| 4,539,868 A | * | 9/1985 | Habu ........................... 701/64 |
| 4,555,691 A | * | 11/1985 | Hosaka et al. ............... 340/439 |
| 4,559,599 A | * | 12/1985 | Habu et al. .................... 701/62 |
| 4,604,700 A | * | 8/1986 | Igarashi et al. ................ 701/64 |
| 4,703,304 A | * | 10/1987 | Muguruma et al. .......... 340/439 |
| 4,773,373 A | * | 9/1988 | Morita et al. ........... 123/406.47 |
| 4,853,673 A | * | 8/1989 | Kido et al. .................. 340/439 |
| 4,889,014 A | * | 12/1989 | Iwata .......................... 477/101 |
| 5,477,452 A | * | 12/1995 | Milunas et al. ................. 701/1 |
| 5,954,781 A | * | 9/1999 | Slepian et al. ................ 701/96 |
| 6,092,021 A | * | 7/2000 | Ehlbeck et al. .............. 701/123 |
| 6,356,831 B1 | * | 3/2002 | Michelini et al. ............. 701/56 |
| 6,411,888 B1 | * | 6/2002 | Weisman, II ................ 701/115 |
| 6,600,413 B1 | * | 7/2003 | Lo ............................. 340/439 |
| 6,726,594 B2 | * | 4/2004 | Mizuno et al. ................ 477/37 |
| 2002/0165694 A1 | * | 11/2002 | Chene et al. ................ 702/182 |

FOREIGN PATENT DOCUMENTS

JP    2000-205925    7/2000

\* cited by examiner

*Primary Examiner*—Michael J. Zanelli
(74) *Attorney, Agent, or Firm*—Rabin & Berdo, PC

(57) ABSTRACT

An evaluation system for vehicle operating conditions which is applied to a vehicle provided with an engine (1) and a manual transmission (8) connected to the engine (1) comprises a sensor (21, 24) for detecting the operating conditions of the engine (1) and a controller (30). On the basis of the operating conditions of the engine (1), the controller (30) determines whether or not the fuel economy of the vehicle would be improved by shifting the transmission (8) upward from the current gear position to a gear position one step further toward a HIGH side, and instructs a driver to shift the transmission (8) upward when it is determined that the fuel economy of the vehicle would be improved by shifting the transmission (8) upward.

12 Claims, 11 Drawing Sheets

EVALUATION SYSTEM FOR VEHICLE OPERATING CONDITIONS

FIELD OF THE INVENTION

This invention relates to a system for evaluating vehicle operating conditions.

BACKGROUND OF THE INVENTION

JP 2000-205925A, published in 2000 by the Japan Patent Office, discloses a fuel economy display device. This device calculates the fuel consumption based on a fuel injection pulse signal output from an engine controller and calculates traveled distance based on a vehicle speed pulse signal output from a vehicle speed sensor. Fuel economy is then calculated by dividing the calculated traveled distance by the fuel consumption, and the calculated fuel economy is displayed to a driver.

SUMMARY OF THE INVENTION

To improve fuel economy in a vehicle installed with a manual transmission, it is effective to shift the transmission upward at an appropriate timing. However, it is difficult for a driver to know when a speed change operation should be performed in order to improve fuel economy simply by observing displayed fuel economy calculation results.

An object of this invention is therefore to display to a driver appropriate driving operations for improving fuel economy.

According to this invention, an evaluation system for vehicle operating conditions which is applied to a vehicle provided with an engine and a manual transmission connected to the engine comprises a sensor for detecting the operating conditions of the engine, a sensor for detecting the gear position of the transmission, and a controller. On the basis of the operating conditions of the engine, the controller determines whether or not the fuel economy of the vehicle would be improved by performing an upshift from the current gear position, and instructs a driver to shift the transmission upward when it is determined that the fuel economy of the vehicle would be improved by performing an upshift.

According to this invention, if an improvement in fuel economy can be expected by shifting the transmission upward, the driver is instructed to perform an upshift, and thus appropriate shift timing can be taught to the driver so that if the driver performs an upshift operation in accordance therewith, the fuel economy can be improved.

Embodiments and advantages of this invention will be described in detail below with reference to the attached drawings.

DESCRIPTION OF THE PREFERRED EMBODIMENTS

Figure 1:
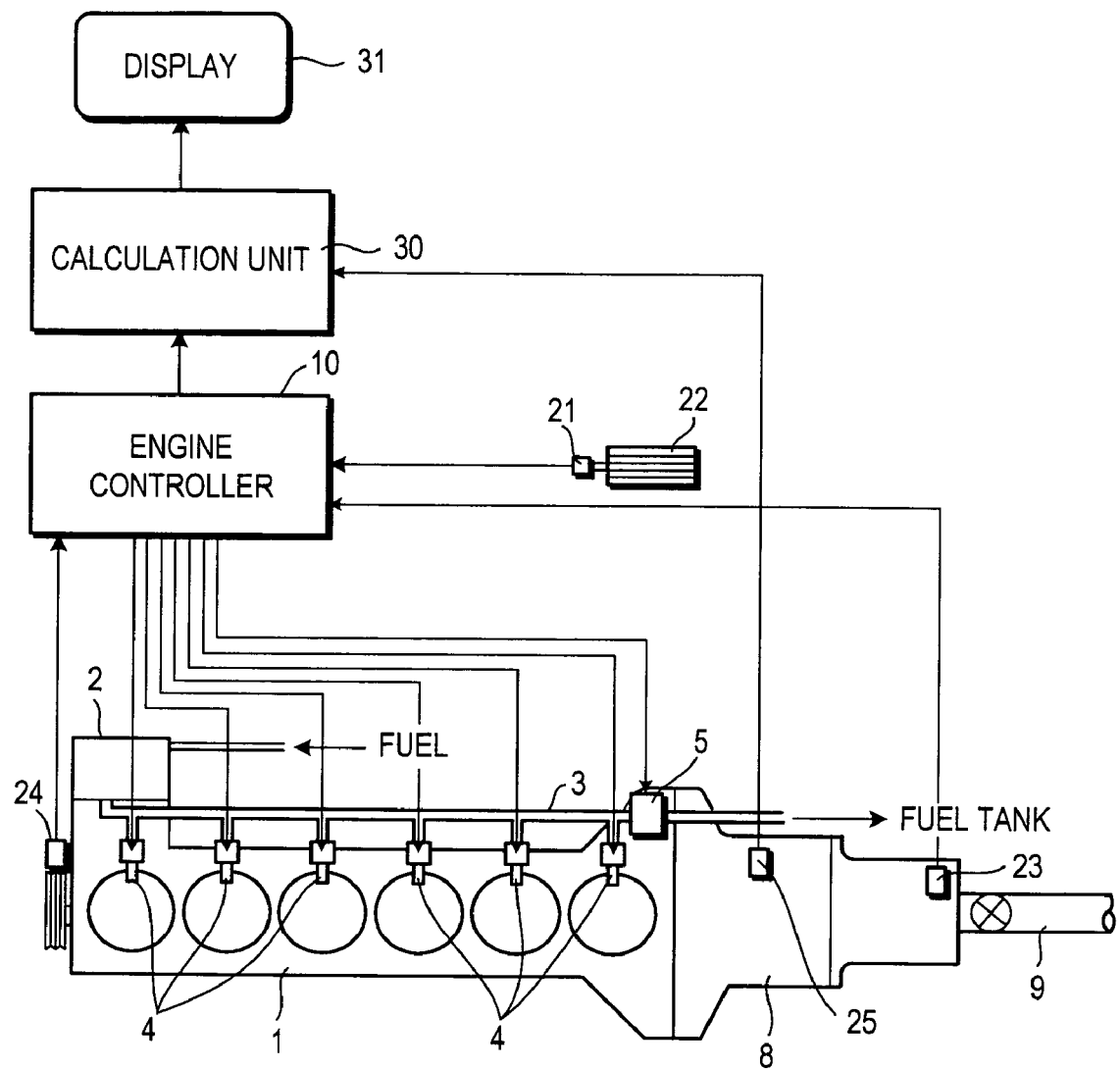
FIG. 1 is a schematic diagram of a vehicle installed with an evaluation system for vehicle operating conditions according to this invention.

FIG. 1 shows the schematic constitution of a vehicle comprising the evaluation system for vehicle operating conditions according to this invention. An engine 1 is a common rail diesel engine. Fuel supplied from a fuel tank is pressurized by a high-pressure fuel pump 2 and then accumulated in a common rail 3. By driving electronic control injectors 4, the fuel is injected into the cylinders of the engine 1. A pressure control valve 5 is a valve for adjusting the pressure inside the common rail 3. The pressure control valve 5 opens automatically when the fuel pressure inside the common rail 3 reaches a predetermined high pressure and prevents the fuel pressure inside the common rail 3 from rising excessively.

An output shaft of the engine 1 is connected to drive wheels via a transmission 8, a propeller shaft 9, and a differential gear unit not shown in the drawing. The output of the engine 1 is transmitted to the drive wheels through these components. The transmission 8 is a manual transmission having six forward speeds and one reverse speed and is constituted by planetary gear mechanisms, brakes, clutches, and so on. By operating a select lever, a driver may alter the gear position of the transmission 8. It should be noted that the transmission 8 may also be a semi-automatic transmission in which clutch operations are performed automatically.

An operation amount AOA of an accelerator pedal 22 detected by an accelerator sensor 21, a vehicle speed V detected by a vehicle speed sensor 23, and a rotation speed Ne of the engine 1 detected by an engine rotation speed sensor 24 are input into an engine controller 10 as signals indicating the operating conditions of the engine 1. The engine controller 10 determines a fuel injection timing and fuel injection amount of the engine 1 based on the input signals and outputs a drive signal to the injectors 4.

A calculation unit 30 for evaluating the operating conditions of the vehicle is connected to the engine controller 10, and the aforementioned signals indicating the operating conditions of the engine 1 are also input into the calculation unit 30 via the engine controller 10. Signals from a gear position sensor 25 for detecting the gear position of the transmission 8 are input into the calculation unit 30 together with the signals input from the engine controller 10. The gear position sensor 25 may also be a sensor which detects the position of the select lever.

The calculation unit 30 comprises one, two, or more CPUs, memory, and an input/output interface. On the basis of the input signals or maps and tables stored in the memory, the calculation unit 30 calculates a fuel consumption amount and fuel economy of the vehicle, an excess drive force and excess drive force ratio, and an excess fuel consumption amount, determines the suitability of the gear position of the transmission 8, and displays the results thereof on a display 31. The display 31 is an LCD disposed on the dashboard, for example. The display 31 may be incorporated into a meter panel or center console.

Specifically, a torque map defining the relationship of engine torque to accelerator operation amount and engine rotation speed (FIG. 2), a fuel consumption ratio map defining the relationship of the fuel consumption ratio (brake specific fuel consumption) to engine rotation speed and engine torque (FIG. 3), temporal change characteristic tables showing the manner in which the engine torque and fuel consumption ratio change in accordance with the traveled distance (FIGS. 4A, 4B), and a vehicle running performance map showing the relationship between vehicle speed and running resistance on a flat road and the relationship between drive force, engine rotation speed, and vehicle speed in each gear position (FIG. 5) are stored in the memory of the calculation unit 30.

The numerals in the maps which are surrounded by circles or squares indicate the gear position of the transmission 8. In the drawings, only a part of the gear position characteristic is displayed for the sake of clarity. These maps and tables are preferably created based on data obtained during engine development, but may be created based on the results of a vehicle test run.

The calculation of the fuel consumption amount and fuel economy of the vehicle, the excess drive force and excess drive force ratio, and the excess fuel consumption amount, and the determination as to the suitability of the gear position of the transmission 8 are performed in the evaluation of the vehicle operating conditions performed by the calculation unit 30. Evaluation of the vehicle operating conditions performed in the calculation unit 30 will be described in detail below.

(1) Calculation of the Fuel Consumption Amount and Fuel Economy

Figure 2:
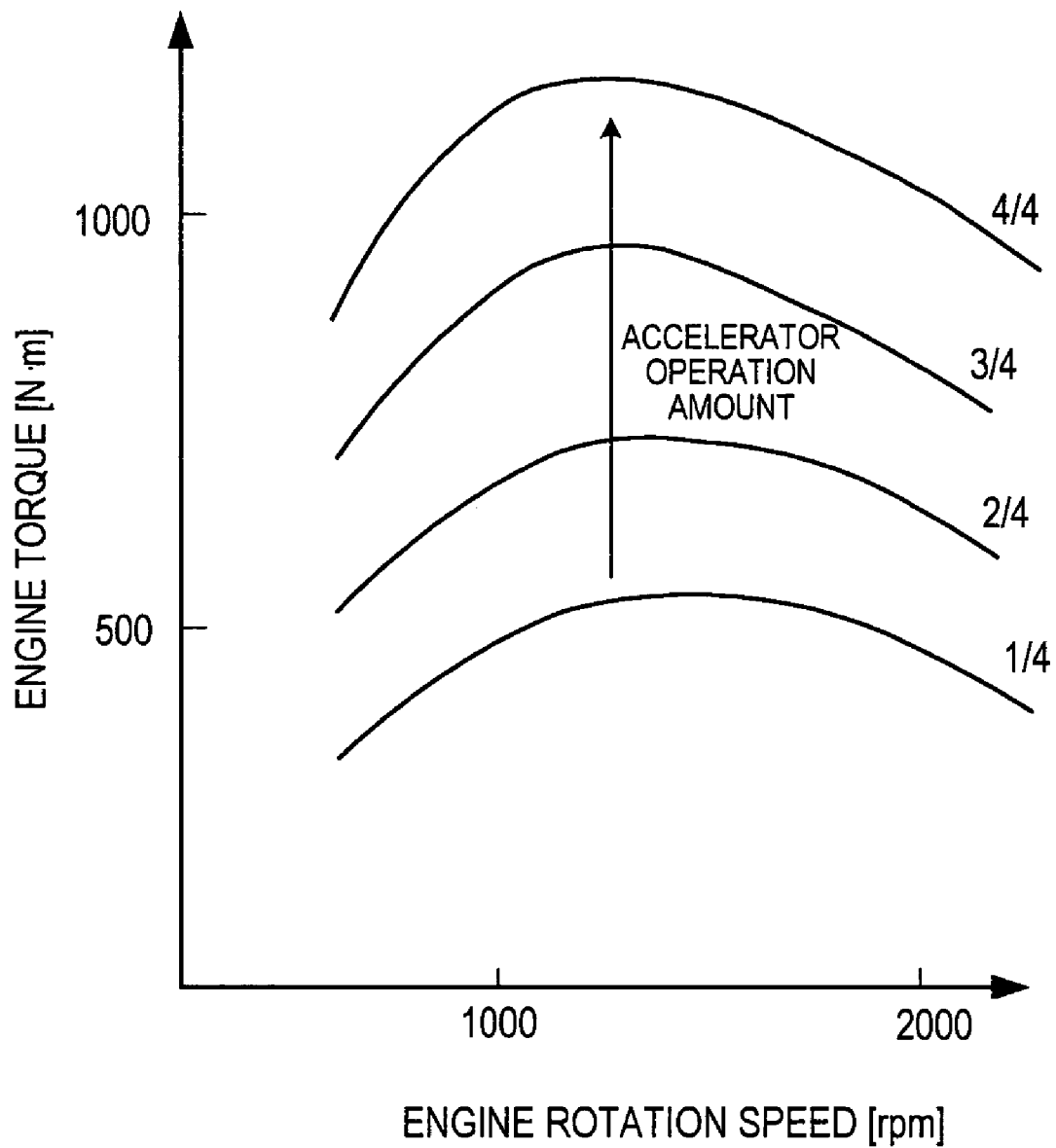
FIG. 2 is a torque map defining the relationship of engine torque to accelerator operation amount and engine rotation speed.

To calculate the fuel consumption amount Q [l], first the calculation unit 30 refers to the torque map shown in FIG. 2 to determine an engine torque Te [N·m] from the accelerator operation amount AOA and engine rotation speed Ne detected by the sensors 21, 24, and thereby calculates an engine output Pe [kW] according to the following equation (1).

$$Pe = \frac{\pi \cdot Te \cdot Ne}{30} \cdot \frac{1}{1000} \quad (1)$$

Figure 3:
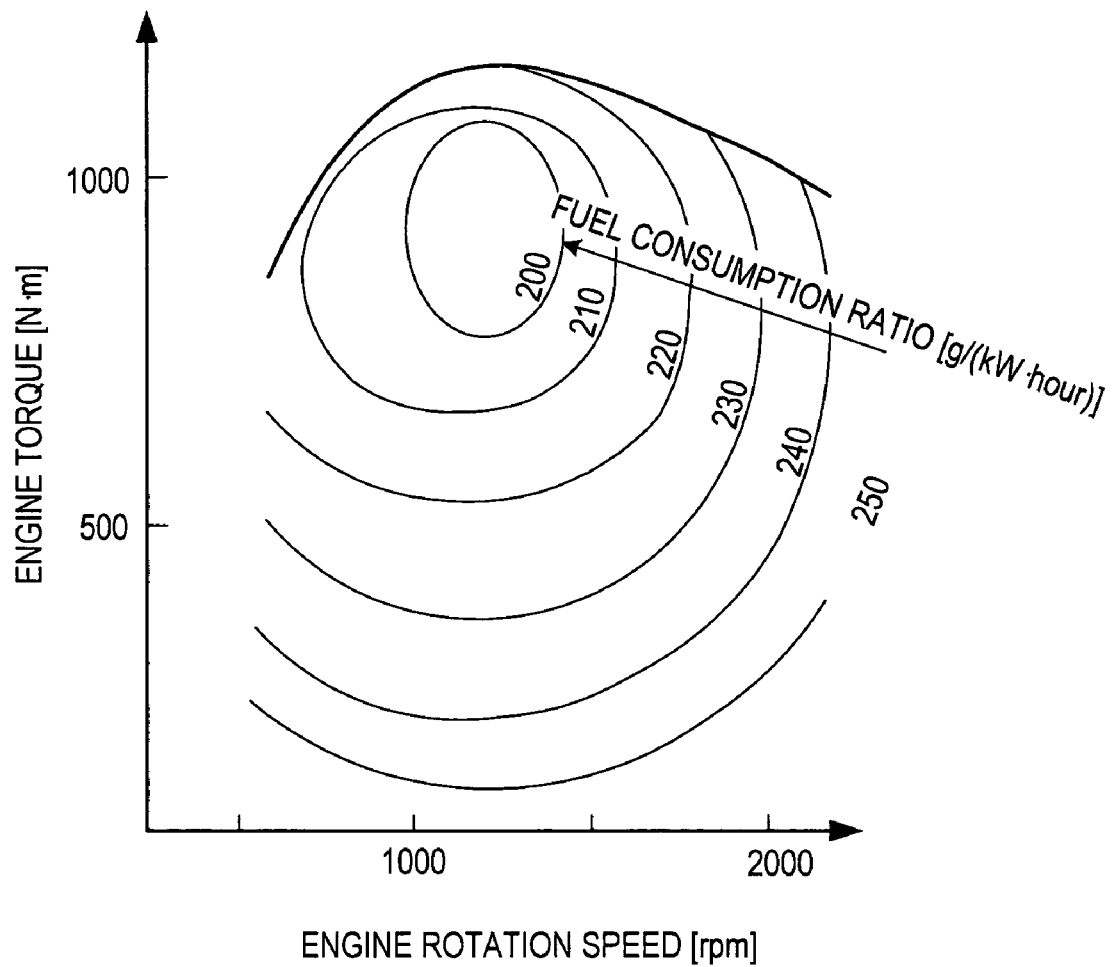
FIG. 3 is a fuel consumption ratio map defining the relationship of the fuel consumption ratio (brake specific fuel consumption) to engine rotation speed and engine torque.

A fuel consumption ratio BSFC [g/(kW·hour)] is then determined from the engine rotation speed Ne and engine torque Te by referring to the fuel consumption ratio map shown in FIG. 3.

The fuel consumption amount Q [l] is then calculated based on the engine output Pe, fuel consumption ratio BSFC, a fuel density ρ [kg/l], and a running time h [hour] according to the following equation (2).

$$Q = \frac{BSFC \cdot Pe \cdot h}{\rho \cdot 1000} \quad (2)$$

The fuel economy FE [km/l] is then calculated based on the fuel consumption amount Q [l] and a traveled distance D [km] obtained by time-integrating the vehicle speed V detected by the sensor 23 according to the following equation (3).

$$FE = \frac{D}{Q} \quad (3)$$

The calculated fuel consumption amount Q and fuel economy FE are transmitted to the display 31 and displayed on the display 31. In a default setting, the average fuel economy in the current gear position from a predetermined time in the past is displayed on the display 31, but the instantaneous fuel economy, best previous fuel economy, fuel economy in other gear positions, and so on may be selected at will by the driver and displayed.

(2) Calculation of Excess Drive Force and Excess Drive Force Ratio

The excess drive force Fex is a value obtained by subtracting the value of the running resistance R excluding acceleration resistance Ra(R=Rs+Rl+Rr) from the drive force F transmitted to the drive wheels from the engine 1. If the excess drive force Fex is negative, then the vehicle is decelerating, and if positive, the vehicle is accelerating. If the excess drive force Fex is extremely high, it can be estimated that unnecessary drive force is being exerted, and thus it can be determined that a shift to a higher gear is required immediately, or that an operation is required to reduce the accelerator operation amount.

Figure 6:
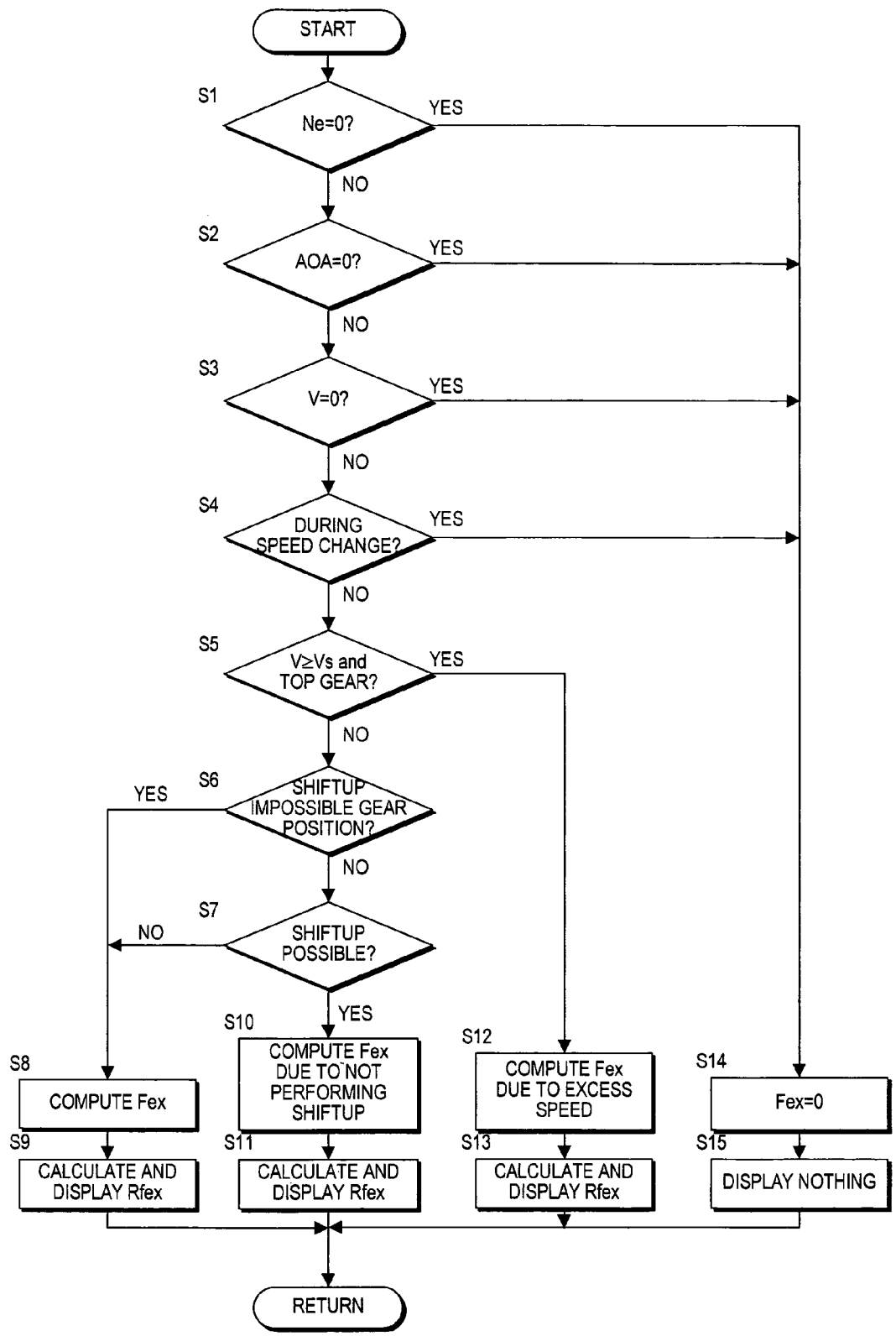
FIG. 6 is a flowchart showing calculation processing for an excess drive force and excess drive force ratio and display processing for the calculated excess drive force ratio.

FIG. 6 shows calculation processing for the excess drive force and excess drive force ratio, and processing for displaying the calculated excess drive force ratio on the display 31. This processing is executed repeatedly at predetermined time intervals in the calculation unit 30.

First, in steps S1 through S3, a determination is made as to whether or not the engine rotation speed Ne, the accelerator operation amount AOA, and the vehicle speed V are respectively zero. If any one of the engine rotation speed Ne, the accelerator operation amount AOA, and the vehicle speed V is zero, then the process advances to steps S14 and S15, and the excess drive force Fex is set to zero. In this case, nothing is displayed on the display 31.

In a step S4, a determination is made as to whether or not a speed change is currently being performed, or in other words whether the clutch is disengaged. If it is determined that a speed change is being performed, the process advances to the steps S14, S15, and in this case also, the excess drive force Fex is set to zero and nothing is displayed on the display 31.

If it is determined that a speed change is not being performed, then the process advances to a step S5, where a determination is made as to whether or not the current vehicle speed V is higher than a specified vehicle speed Vs, and whether or not the gear position is the gear furthest toward a HIGH side (top gear, which is sixth gear in this embodiment). The specified vehicle speed Vs is set to 50 [km/hour] for traveling on ordinary roads and 80 [km/hour] for traveling on expressways, for example. When the vehicle speed V is greater than the specified vehicle speed Vs and the gear position is the top gear, the process advances to a step S12, where the excess drive force Fex due to excess speed is calculated.

To calculate the excess drive force Fex due to excess speed, first air resistance Ra at the current vehicle speed V and air resistance Ras at the specified vehicle speed Vs are respectively calculated. The difference between the two is then calculated as excess air resistance Raex. The result of adding the excess air resistance Raex to the excess drive force Fex that is obtained by subtracting the running resistance R excluding acceleration resistance from the drive force F is calculated as the excess drive force Fex due to excess speed. Once the excess drive force Fex due to excess speed is calculated, the process advances to a step S13.

In the step S13, the excess drive force ratio Rfex is calculated according to the following equation (4) and displayed on the display 31.

$$Rfex = \frac{Fex}{F\max} \times 100 \qquad (4)$$

It should be noted, however, that when the vehicle is running at a constant speed and the ratio [%] of the excess air resistance Raex to the current drive force F is greater than the excess drive force ratio Rfex, then this ratio is displayed on the display 31 in lieu of the excess drive force ratio Rfex.

When the vehicle is running at a lower speed than the specified vehicle speed Vs, or when the gear position is not the top gear, the process advances to a step S6. In the step S6, a determination is made as to whether the gear position is a gear position at which an upshift is impossible (sixth gear or reverse gear in this embodiment). If it is determined that the gear position is a position at which an upshift is impossible, then the process advances to a step S8. In the step S8, the excess drive force Fex is calculated by subtracting the running resistance R excluding acceleration resistance from the current drive force F. In a step S9, the excess drive force ratio Rfex is calculated according to the above equation (4) and displayed on the display 31.

If it is determined in the step S6 that the gear position is not a position at which an upshift is impossible, the process advances to a step S7. In the step S7, a determination is made as to whether or not an upshift is possible. The determination as to whether or not an upshift is possible is made as follows. First, an engine rotation speed Neup assuming that a single speed upshift has been performed is obtained by referring to the vehicle running performance map shown in FIG. 5, whereupon an engine torque Teupmax at full load at the engine rotation speed Neup when performing a single speed upshift is calculated with reference to the torque map shown in FIG. 2. Then, a drive force (maximum drive force) Fupmax at full load when performing a single speed upshift is calculated on the basis of the engine torque Teupmax at full load. If the engine rotation speed Neup following a single speed upshift is greater than a specified rotation speed, and if the maximum drive force Fupmax following a single speed upshift is greater than the running resistance R(=RS+Rl+Rr), it is determined that an upshift is possible, and if not, it is determined that an upshift is not possible.

If an upshift is not possible, then the process advances to steps S8, S9, where the excess drive force Fex is calculated by subtracting the running resistance R from the current drive force F. The excess drive force ratio Rfex is then calculated according to the above equation (4) and displayed on the display 31.

If it is determined that an upshift is possible, then the process advances to a step S10 and the excess drive force Fex when an upshift is possible is calculated. The excess drive force Fex when an upshift is possible is calculated by obtaining an excess fuel consumption amount Qexup caused by not performing an upshift, which is the difference between the fuel consumption amount Qup (the method of calculation of which is described below) expected to occur as a result of an upshift and the current fuel consumption amount Q, and converting this into drive force. The conversion value to drive force is calculated by converting the excess fuel consumption amount Qexup to engine torque with the aid of a relational expression between the engine torque and the fuel consumption amount derived from the equations (1) and (2), and by further substituting this into the following equation (5).

$$F = \frac{Te \cdot it \cdot if \cdot \eta}{r} \qquad (5)$$

In the equation (5), it is the speed ratio in the current gear position of the transmission 8, if is the deceleration ratio of the differential gear unit, η is the transmission efficiency, and r [m] is the dynamic load radius of the tire (similar below).

In a step S11, the excess drive force Fex and the maximum drive force Fupmax following a single speed upshift are substituted into the equation (4), whereby the excess drive force ratio Rfex is calculated and displayed on the display 31. When the vehicle is running at a constant speed and the ratio [%] of the excess drive force Fex to the current drive force F is greater than the excess drive force ratio Rfex, this ratio is displayed on the display 31 in lieu of the excess drive force ratio Rfex.

(3) Calculation of the Excess Fuel Consumption Amount

The excess fuel consumption amount Qex is the amount of fuel consumed in excess due to driving which worsens fuel economy such as the use of excess drive force Fex. The excess fuel consumption amount Qex is calculated as the difference between the actual amount of fuel consumed and the fuel consumption amount assuming that an operation which worsens fuel economy has not been performed. By referring to the excess fuel consumption amount Qex, the amount of fuel consumed in excess, or in other words the amount of fuel that can be saved by improving driving operations, can be known.

The excess fuel consumption amount Qex is calculated as the sum of the excess fuel consumption amount Qexf due to the use of excess drive force, the excess fuel consumption amount Qexsp due to excess speed, the excess fuel consumption amount Qexup caused by not performing an upshift, the excess fuel consumption amount Qexrc caused by racing, and the excess fuel consumption amount Qexidl caused by idling.

The excess fuel consumption amount Qexf due to the use of excess drive force is the amount of fuel consumed in excess by using the excess drive force Fex, and is calculated based on the excess drive force Fex. More specifically, first the excess torque Tex [N·m] is obtained from the excess drive force Fex according to the following equation (6).

$$Tex = \frac{Fex \cdot r}{it \cdot if \cdot \eta} \tag{6}$$

The excess output Pex [kW] is then calculated from the excess torque Tex according to the following equation (7).

$$Pex = \frac{\pi \cdot Tex \cdot Ne}{30 \cdot 1000} \tag{7}$$

The excess fuel consumption amount Qexf due to the use of excess drive force is calculated from the excess output Pex with the aid of the following equation (8).

$$Qexf = \frac{Pex \cdot BSFC \cdot h}{\rho \cdot 1000} \tag{8}$$

The excess fuel consumption amount Qexsp due to excess speed is the amount of fuel consumed in excess as a result of increased air resistance caused when the vehicle is driven at a higher speed than the specified vehicle speed Vs. The specified vehicle speed Vs is set to 50 [km/hour] on ordinary roads and 80 [km/hour] on expressways, for example. The excess fuel consumption amount Qexsp due to excess speed is calculated as the difference between the fuel consumption amount Q at the time of excess speed and a fuel consumption amount Qs expected at the time of the specified vehicle speed Vs. More specifically, first the drive force Fs at the time of the specified vehicle speed, excluding the increased portion of air resistance due to excess speed (=the current air resistance Rl—the specified vehicle speed air resistance Rls) from the current air resistance Rl, is calculated according to the following equation (9) with the running resistance R(= Rr+Rs +Ra) serving as the same condition.

$$F = \frac{Te \cdot it \cdot if \cdot \eta}{r} = Rr + Rl + Rs + Ra \tag{9}$$

From the drive force Fs at the time of the specified vehicle speed, an engine torque Tes [N·m] at the time of the specified vehicle speed is obtained according to the following equation (10).

$$Tes = \frac{Fs \cdot r}{it \cdot if \cdot \eta} \tag{10}$$

An engine rotation speed Nes [rpm] at the time of the specified vehicle speed is calculated according to the following equation (11).

$$Nes = \frac{Vs \cdot it \cdot if \cdot 1000}{2\pi r \cdot 60} \tag{11}$$

The fuel consumption ratio BSFC [g/kW·hour] corresponding to the engine rotation speed Nes and engine torque Tes at the time of the specified vehicle speed is determined by referencing the map shown in FIG. 3, and an engine output Pes [kW] at the time of the specified vehicle speed is obtained according to the following equation (12).

$$Pes = \frac{\pi \cdot Tes \cdot Ne}{30 \cdot 1000} \tag{12}$$

The fuel consumption amount Qs [l] at the time of the specified vehicle speed is then obtained with the aid of the following equation (13).

$$Qs = \frac{Pes \cdot BSFC \cdot h}{\rho \cdot 1000} \tag{13}$$

The excess fuel consumption amount Qexsp due to excess speed is calculated by subtracting the fuel consumption amount Qs at the time of the specified vehicle speed from the current fuel consumption amount Q.

The excess fuel consumption amount Qexup when an upshift is not performed is the amount of fuel consumed in excess when the operating points of the engine fall outside of a favorable fuel consumption ratio region due to the driver neglecting to perform a speed change operation in spite of being under operating conditions in which an upshift is possible. The excess fuel consumption amount Qexup when an upshift is not performed is calculated as the difference between the current fuel consumption amount Q and the fuel consumption amount Qup expected by performing an upshift. More specifically, first an engine torque Teup [N·m] following an upshift is calculated from the following equation (14).

$$Teup = Te \times \frac{it}{itup} \times \frac{\eta_1}{\eta_1 up} \tag{14}$$

In the equation, it is the current speed ratio, itup is the speed ratio following an upshift, $\eta_1$ is the current transmission efficiency, and $\eta_1 up$ is the transmission efficiency following an upshift.

An engine output Peup [kW] following an upshift is calculated according to the following equation (15).

$$Peup = \frac{\pi \cdot Teup \cdot Neup}{30 \cdot 1000} \tag{15}$$

The fuel consumption ratio BSFC [g/kW·hour] corresponding to the engine torque Teup and engine rotation speed Neup following an upshift is determined with reference to the map shown in FIG. 3, and the expected fuel consumption amount Qup following an upshift is calculated according to the following equation (16).

$$Qup = \frac{Peup \cdot BSFC \cdot h}{\rho \cdot 1000} \tag{16}$$

The excess fuel consumption amount Qexup when an upshift is not performed is then calculated by subtracting Qup from the current fuel consumption amount Q.

The excess fuel consumption amount Qexrc caused by racing is the amount of fuel consumed in excess by racing the engine 1 when the vehicle is stationary and the clutch is released. The excess fuel consumption amount Qexrc due to racing is calculated by first obtaining an output Peidl [kW] during idling according to the following equation (17).

$$Peidl = \frac{\pi \cdot Teidl \cdot Ne}{30 \cdot 1000} \quad (17)$$

The indicated torque Teidl is the torque required for the engine itself to rotate against friction in the main movement system, valve operating system, auxiliary equipment, and the like. The fuel consumption amount Qidl during idling is calculated by substituting the output Peidl during idling into the following equation (18).

$$Qidl = \frac{Peidl \cdot BSFC \cdot h}{\rho \cdot 1000} \quad (18)$$

The fuel consumption amount Qexrc due to racing is then calculated by subtracting the fuel consumption amount Qidl during idling from the current fuel consumption amount Q.

The excess fuel consumption amount Qexidl during idling is the amount of fuel consumed during a period of idling which is longer than a predetermined length of time of 20 [sec], for example. The fuel consumption amount Q when this idling condition is established is directly designated as the excess fuel consumption amount Qexidl.

A value obtained by adding the excess fuel consumption amount Qexf due to the use of excess drive force, the excess fuel consumption amount Qexsp due to excess speed, the excess fuel consumption amount Qexup when an upshift is not performed, the excess fuel consumption amount Qexrc due to racing, and the excess fuel consumption amount Qexidl due to idling, which are calculated as described above, constitutes the excess fuel consumption amount Qex. The computed excess fuel consumption amount Qex is displayed on the display 31.

Figure 7:
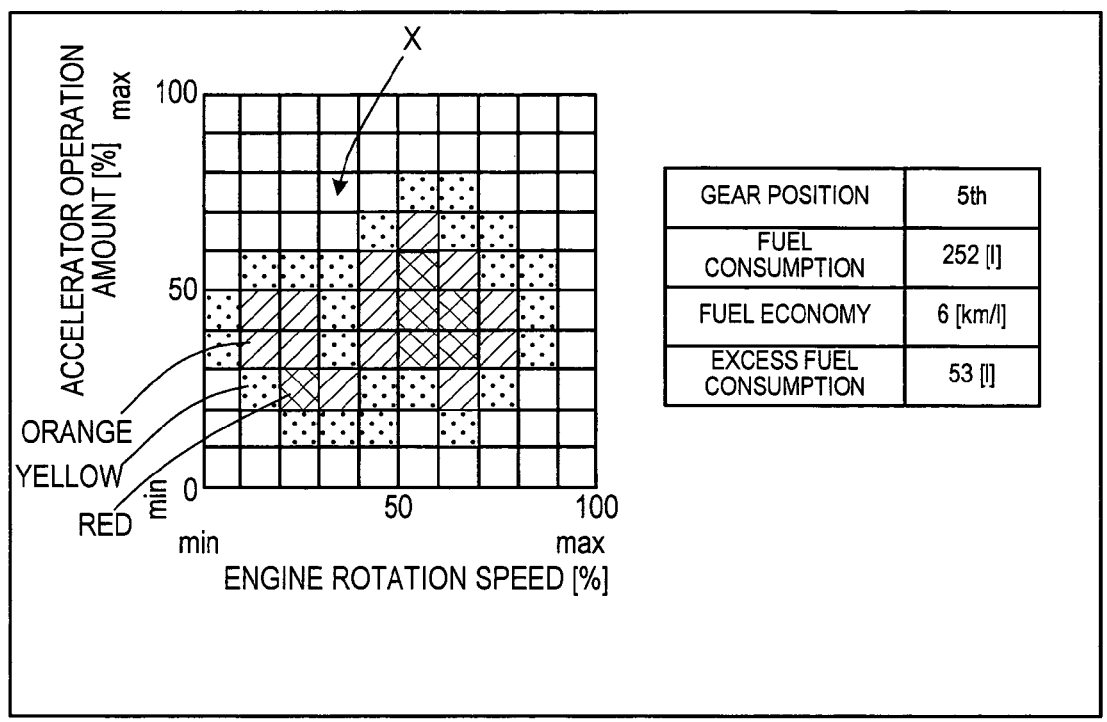
FIG. 7 is a view showing an example of the contents displayed on a display.

FIG. 7 shows an example of the contents displayed on the display 31. The current gear position of the transmission 8, the calculated fuel consumption amount, the fuel economy, and the excess fuel consumption amount are displayed on the display 31 alongside a two-dimensional map showing the frequency of each operating point of the engine 1. It should be noted that data for the current gear position are displayed on the display 31, but when necessary, the driver may display data for other gear positions.

The two-dimensional map is divided into 100 squares. The abscissa is set as engine rotation speed and the ordinate is set as accelerator operation amount, and each is divided into ten stages of 10% intervals such that the maximum value of each is 100%. A ten-minute driving history is stored in the memory of the calculation unit 30, and on the basis of this driving history, the calculation unit 30 calculates the frequency with which the engine 1 is operated in each of the squares in the corresponding gear position (the usage frequency of the operating point corresponding to each square) and displays this frequency by varying the display color in accordance with the frequency. It should be noted, however, that if the screen is updated constantly, the display content changes rapidly which is vexing for the driver, and thus screen updates are preferably performed at predetermined time intervals of one or two minutes, for example.

As regards this color variation according to frequency, by displaying squares with an operating frequency of above 5% in red, squares with an operating frequency of 3% to 5% in orange, squares with an operating frequency below 3% in yellow, and squares with an operating frequency of 0% in black, for example, the driver is able to understand his/her own driving characteristics intuitively as an image.

Moreover, by observing this frequency distribution display, the driver can easily recognize the driving operation that should be performed to improve fuel economy. More specifically, a square X in which the fuel consumption ratio is at a minimum (most favorable fuel economy) exists among the squares, and in order to improve the fuel economy, the driver must drive in such a manner that deviation of the displayed frequency distribution from the square X is reduced. In the example shown in FIG. 7, for example, the frequency distribution displayed on the display 31 in red and orange deviates from the square X to the lower right side, and thus the driver recognizes that the fuel economy can be improved by reducing the engine rotation speed and increasing the accelerator operation amount.

The torque and fuel consumption ratio of the engine 1 vary in accordance with the distance traveled from the time of factory shipping (initial state) (to be referred to below as "total distance traveled"). In general, from the start of running to several thousand kilometers, the constitutional components in the interior of the engine fit together such that friction is reduced and engine torque is increased. When the total distance traveled exceeds 200,000 kilometers or so, gas leaks through gaps between the piston and cylinders, the adhesion of carbon to the combustion chamber, and so on cause gradual reductions in the engine torque. Accordingly, from the start of running to several thousand kilometers, the fuel consumption ratio decreases, and when the total distance traveled exceeds 200,000 kilometers or so, the fuel consumption ratio increases. To increase the accuracy of fuel economy calculation, the effect of these time variations must be considered.

Figures 4A, 4B:
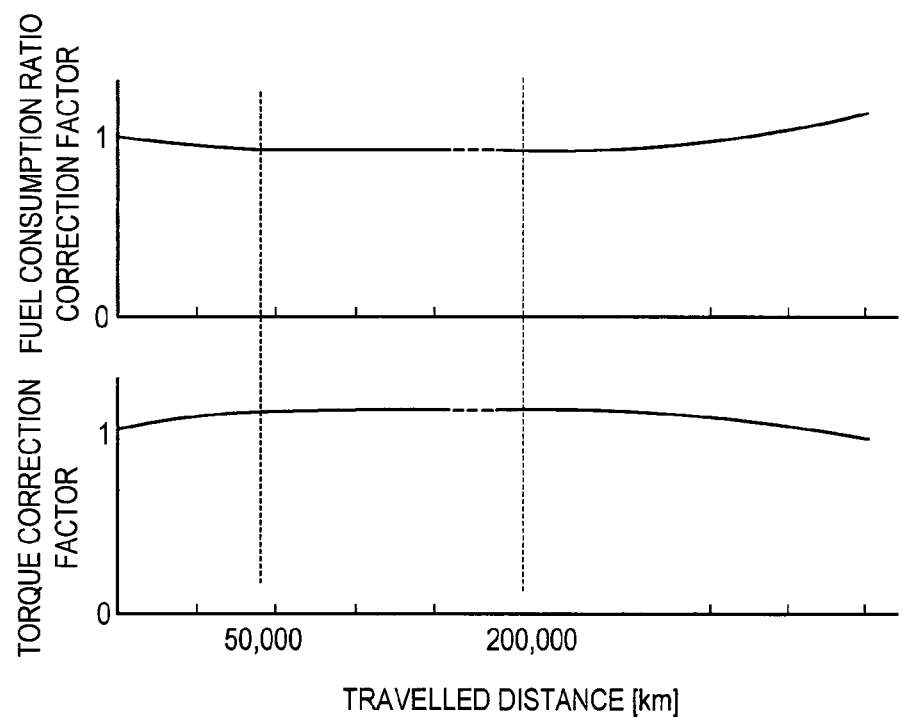
FIGS. 4A, 4B are temporal change characteristic tables showing the manner in which the engine torque and fuel consumption ratio change in accordance with the distance traveled.

FIGS. 4A, 4B are temporal change characteristic tables showing the manner in which the torque and fuel consumption ratio of the engine 1 change in accordance with the total distance traveled. In this example, a torque correction factor indicating the rate of change of engine torque in respect of the engine torque at the time of factory shipping (the initial engine torque) gradually increases up to the point at which the total traveled distance reaches 5,000 [km], and reaches a value of approximately 1.05 (a 5% increase) when the total distance traveled reaches 5,000 [km]. Thereafter, the torque correction factor becomes a substantially constant value, and when the total traveled distance exceeds 200,000 [km], the torque correction factor begins to decrease gradually. A fuel consumption ratio correction factor indicating the rate of change of the fuel consumption ratio in respect of the fuel consumption ratio at the time of factory shipping (the initial fuel consumption ratio) has a substantially opposite characteristic (inverse relationship) to the torque correction factor.

When the fuel economy is calculated in consideration of such temporal variation, the torque map and fuel consumption ratio map are corrected by multiplying each of the values stored in the maps by the torque correction factor or fuel consumption ratio correction factor in accordance with the distance traveled from the time of factory shipping, and the torque and fuel consumption ratio of the engine 1 are determined by referring to the corrected torque map and fuel consumption ratio map.

To reflect temporal variation in the fuel economy calculation using a simpler method, the fuel economy may be calculated using the product of a value obtained by referencing the fuel consumption ratio map and the fuel consumption ratio correction factor as a fuel consumption ratio, or the fuel economy may be calculated by dividing a fuel consumption amount calculated without regard for temporal variation by the fuel consumption ratio correction factor, and using the result thereof as the fuel consumption amount.

(4) Determination of Gear Position Suitability

Next, processing for determining the suitability of the gear position, which is performed by the calculation unit 30, will be described. When it is determined as a result of a determination as to the suitability of the gear position that the gear position is inappropriately low, the driver is instructed to perform an upshift. Upshift instruction is performed by displaying an illustration or message on the display 31, but may be performed by generating a voice or warning sound (similar below).

To determine the suitability of the gear position, first the calculation unit 30 reads the current gear position of the transmission 8 detected by the gear position sensor 25.

The gear position of the transmission 8 may also be estimated. A method in which the gear position is estimated based on the vehicle speed at an engine rotation speed of 1000 [rpm] (to be referred to below as $V_{1000}$) may be used. Since $V_{1000}$ takes a unique value in each gear position, the current gear position may be estimated by storing the value of $V_{1000}$ in each gear position in the memory of the calculation unit 30 and comparing this with the current $V_{1000}$ value. If the gear ratio of the transmission 8 is set such that $V_{1000}$ is 25 [km/hour] in fourth gear, 33 [km/hour] in fifth gear, and 42 [km/hour] in sixth gear, for example, and it is assumed that the current vehicle speed V and engine rotation speed are 50 [km/hour] and 1200 [rpm] respectively, then $V_{1000}$ at this time is 50/1200×1000≅42 [km/hour]. Hence it can be estimated that the current gear position is sixth gear.

Alternatively, the gear position of the transmission 8 may be estimated by calculating the deceleration ratio of the transmission 8 from the engine rotation speed, vehicle speed, effective tire radius, and deceleration ratio of the differential gear unit and comparing this with the deceleration ratio (fixed value) of each gear.

Once the current gear position has been detected or estimated, the fuel consumption ratio in the current gear position and the fuel consumption ratio following an upshift are calculated respectively. The fuel consumption ratio in the current gear position may be determined by referencing the torque map shown in FIG. 2 to determine the engine torque from the engine rotation speed and accelerator operation amount, and from the engine torque and engine rotation speed by referencing the fuel consumption ratio map shown in FIG. 3.

Figure 5:
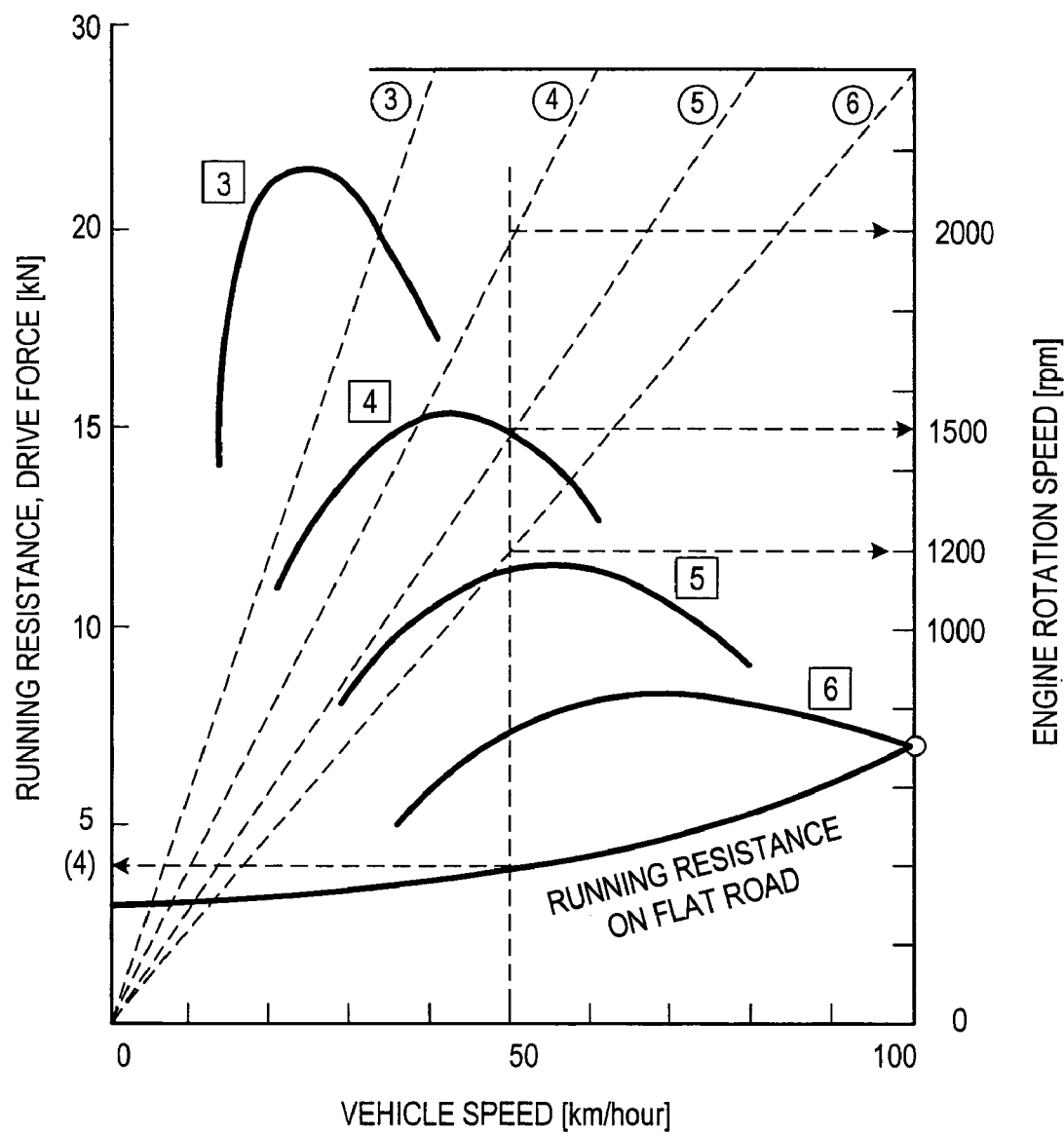
FIG. 5 is a vehicle running performance map showing the relationship between vehicle speed and running resistance on a flat road and the relationship between drive force, engine rotation speed, and vehicle speed in each gear position.

To calculate the fuel consumption ratio following an upshift, first the running performance map shown in FIG. 5 is referenced to calculate the engine rotation speed following an upshift. A rate of engine load increase following an upshift is also determined from the running performance map, and hence the torque of the engine 1 following an upshift is calculated from this rate of increase and the torque prior to an upshift. For example, according to the running performance map, running resistance when traveling at 50 [km/hour] on a flat road is 4 [kN], the engine rotation speed when traveling in fifth gear is 1500 [rpm], and the load is 4 [kN]/12 [kN]=approx. 30 [%]. However, the engine rotation speed following an upshift from this state to sixth gear falls to 1200 [rpm] and the load increases to 4 [kN]/7 [kN] =approx. 60 [%].

Once the rotation speed and torque of the engine 1 following an upshift have been calculated, the fuel consumption ratio map shown in FIG. 3 is referenced to calculate the fuel consumption ratio following an upshift. The calculated fuel consumption ratio following an upshift and the fuel consumption ratio in the current gear position are then compared. If the fuel consumption ratio decreases following an upshift, then an improvement in fuel economy can be expected by performing an upshift, and thus the gear position is determined to be inappropriate and the driver is instructed to perform an upshift.

Next, a second embodiment of this invention will be described.

The second embodiment differs from the first embodiment in the processing performed by the calculation unit 30 to determine the suitability of the gear position.

Figure 8:
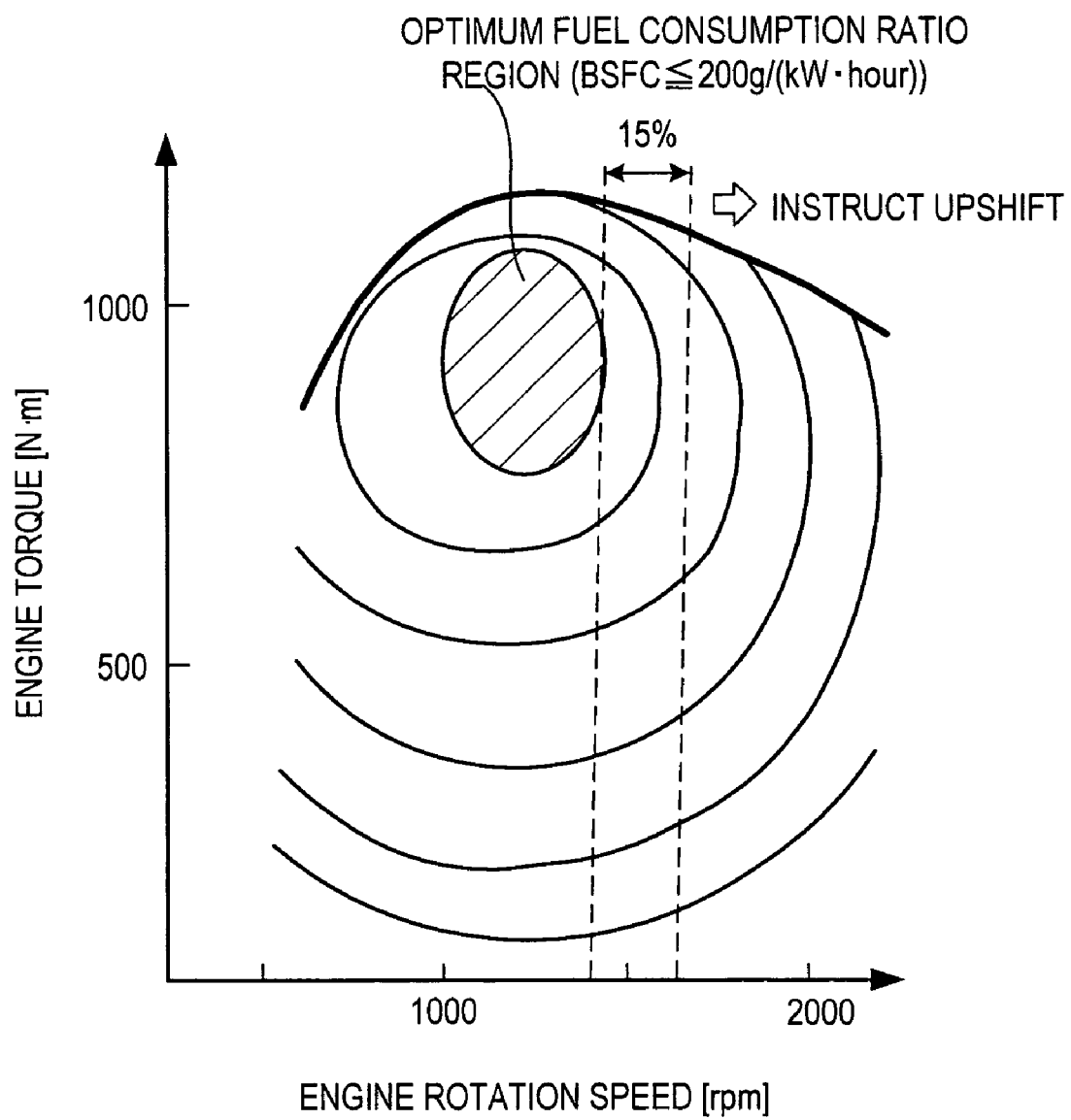
FIG. 8 is a view for illustrating the content of processing to determine gear position suitability in a second embodiment.

When gear position suitability is determined according to the second embodiment, the current engine rotation speed is compared to a maximum rotation speed in an operating region having an optimum fuel consumption ratio. As shown in FIG. 8, when the current engine rotation speed is higher than the maximum rotation speed in the optimum fuel consumption ratio region by a predetermined degree or more (for example 15% or more), it is determined that a gear which is further toward the LOW side than the optimum gear position has been selected, and thus that the engine rotation speed is too high. The optimum fuel consumption ratio region is a region in which the fuel consumption ratio of the engine 1 is most favorable, and here indicates the region in which the fuel consumption ratio is smaller than 200 [g/(kW·hour)].

Hence, when the current engine rotation speed is higher than the maximum rotation speed in the optimum fuel consumption ratio region by a predetermined degree or more, it is determined that the gear position is inappropriate and the driver is instructed to perform an upshift.

According to this method, the suitability of the gear position is determined simply by comparing the current engine rotation speed to the maximum rotation speed (fixed value) in the optimum fuel consumption ratio region. Hence there is no need for complicated calculation processing and the suitability of the gear position can be determined by means of an extremely simply process.

Next, a third embodiment of this invention will be described.

Figure 9:
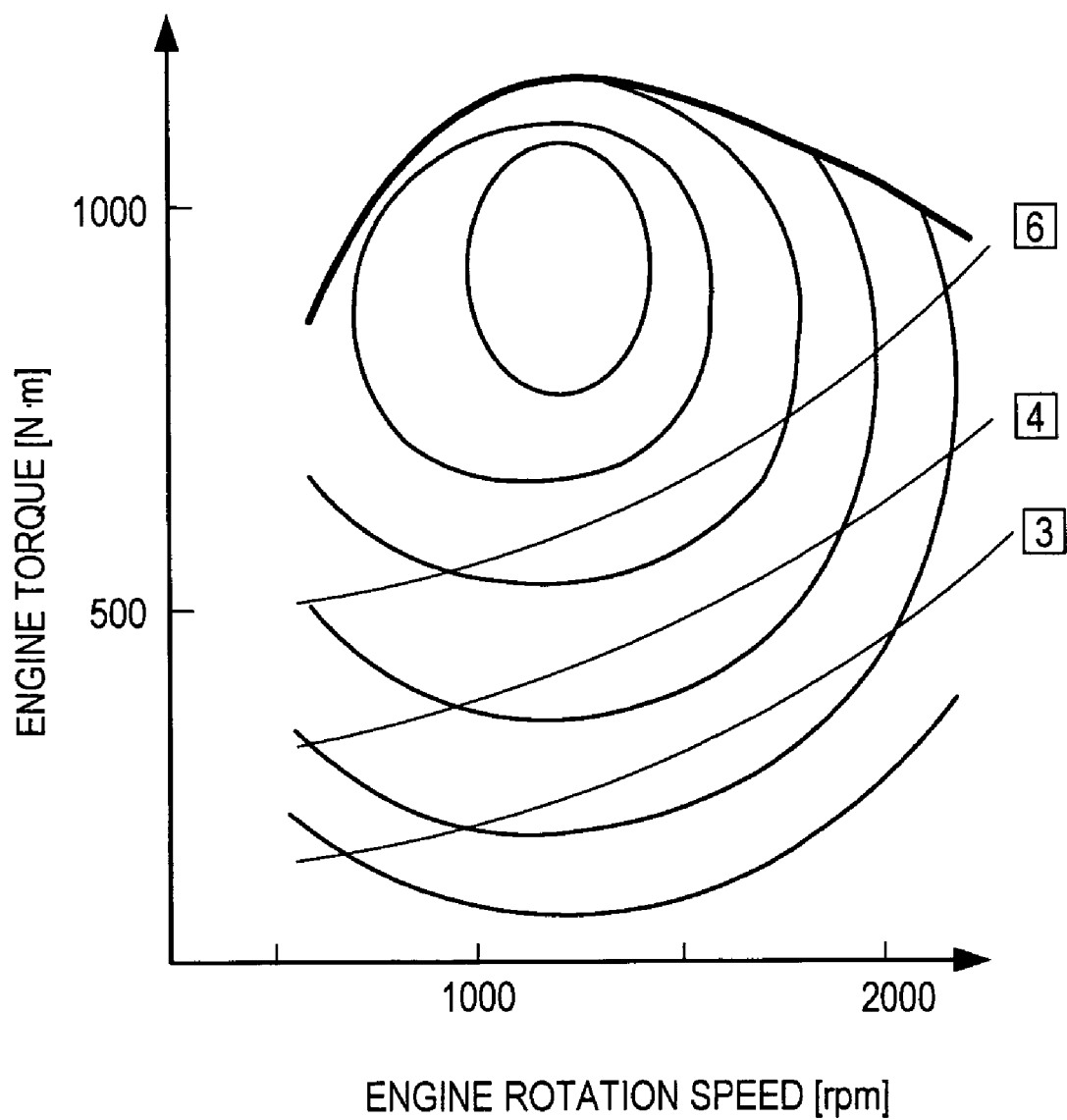
FIG. 9 is a fuel consumption ratio map used in a third embodiment.

In the third embodiment, the required engine torque when traveling along a flat road in each gear position, as shown in FIG. 9, is included in the fuel consumption ratio map stored in the calculation unit 30. Also, processing performed by the calculation unit 30 to determine the suitability of the gear position differs from that of the first embodiment.

To determine gear position suitability, first the optimum gear when traveling on a flat road at the current vehicle speed is determined. The optimum gear is determined by referencing the running performance map shown in FIG. 5 to calculate the rotation speed and load of the engine 1 when traveling in each gear position, and by referencing the fuel consumption ratio map shown in FIG. 9 to calculate the fuel consumption ratio when traveling on a flat road in each gear position. The gear position with the smallest fuel consumption ratio is determined as the optimum gear position, and this is stored together with the engine load when traveling in the optimum gear.

Once the optimum gear has been determined, the current load of the engine 1 is compared with the load of the engine 1 when traveling in the optimum gear. If the current load of the engine 1 is smaller than the load of the engine 1 when traveling in the optimum gear position and the current rotation speed of the engine 1 is higher than the maximum engine rotation speed in the optimum fuel consumption ratio region by a predetermined degree or more (for example 15% or more), it is determined that the vehicle is traveling at a high rotation speed of engine 1 and in a lower gear than the optimum gear position, and thus that the gear position is inappropriate. Accordingly, an illustration or message instructing the driver to perform an upshift is displayed on the display 31.

Next, a fourth embodiment of this invention will be described.

In the fourth embodiment also, the required engine torque when traveling along a flat road in each gear position, as shown in FIG. 9, is included in the fuel consumption ratio map stored in the calculation unit 30, and processing performed by the calculation unit 30 to determine the suitability of the gear position differs from that of the first embodiment.

Figure 10:
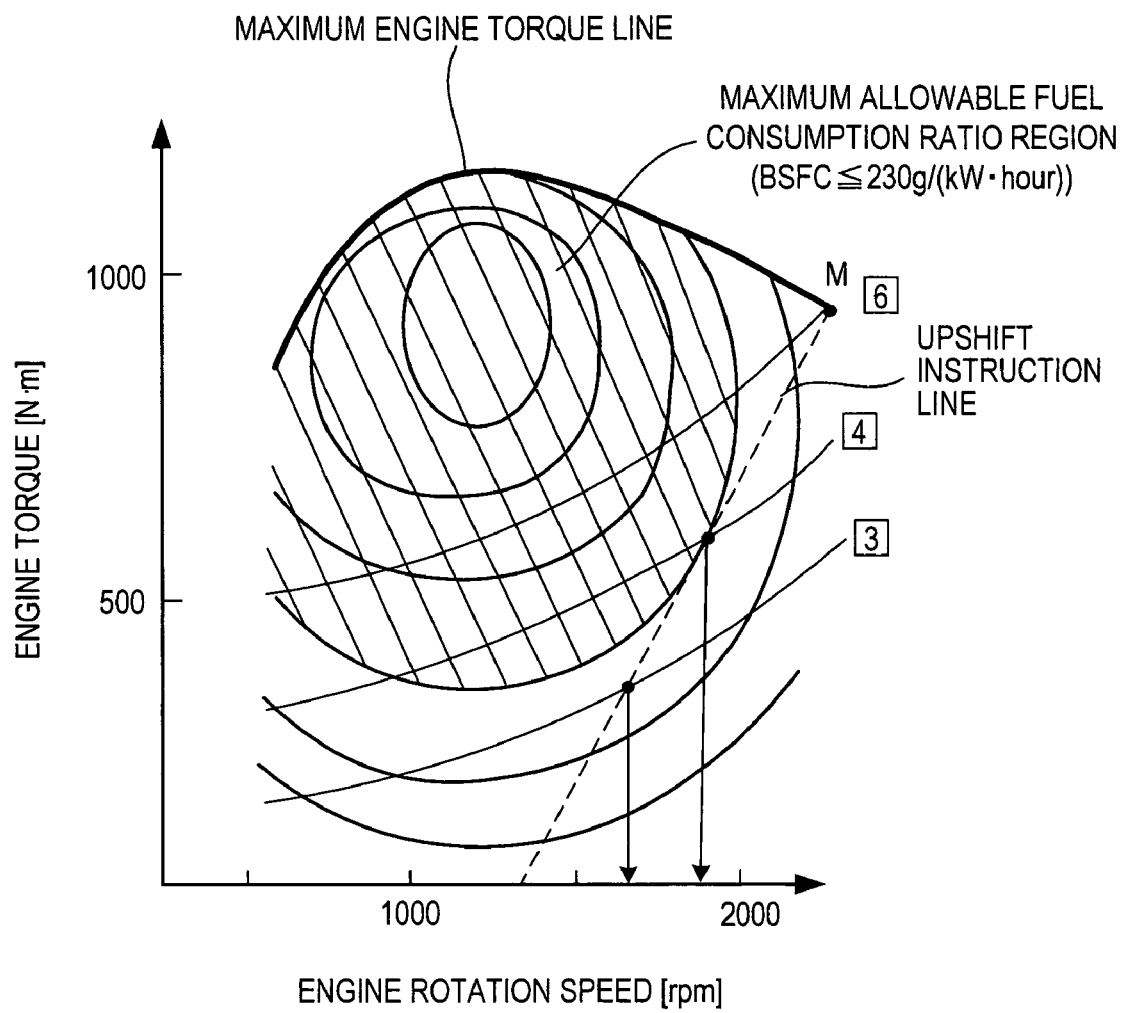
FIG. 10 is a view for illustrating a method of setting an upshift instruction line in a fourth embodiment.

To determine gear position suitability, first an upshift instruction line is set on the fuel consumption ratio map. To set the upshift instruction line, first a point of intersection M between a maximum engine torque line and a line indicating the engine torque required when traveling on a flat road in sixth gear (top gear), which is the gear position furthest toward the HIGH side, is determined on the fuel consumption ratio map as shown in FIG. 10. The intersection point M is the operating point at which maximum vehicle speed is realized.

Next, a straight line contacting a allowable fuel consumption ratio region is drawn from the intersection point M, and this straight line is set as the upshift instruction line. The allowable fuel consumption ratio region is the region in which the fuel consumption ratio is smaller than the allowable fuel consumption ratio. Here, the allowable fuel consumption ratio is set at 230 [g/(kW·hour)], and hence the allowable fuel consumption ratio region is the region shown in the drawing by diagonal shading.

Once the upshift instruction line has been set, the rotation speeds at the intersections between the upshift instruction line and lines indicating the torque required when traveling on a flat road in each gear position are set as upshift instruction rotation speeds for each gear position. In the example shown in FIG. 10, the upshift instruction rotation speeds in fourth gear and second gear are 1850 [rpm] and 1650 [rpm] respectively. An upshift instruction rotation speed is set for each gear position, and the upshift instruction rotation speed is set at a gradually lower value as the gear position moves further toward the LOW side.

A determination is then made as to whether or not the current rotation speed of the engine 1 is higher than the upshift instruction rotation speed in the current gear position. If the current engine rotation speed is higher than the upshift instruction rotation speed, the gear position is determined to be inappropriate and the driver is instructed to perform an upshift.

Here, an upshift instruction rotation speed is set for each gear position and the suitability of the gear position is determined according to whether or not the current engine rotation speed is higher than the upshift instruction rotation speed. However, a determination of suitability of the gear position may be made based on whether or not the operating point of the engine 1, which is determined according to the rotation speed and the torque of the engine 1, is further toward the right than the upshift instruction line (high rotation side, low load side.) In this case, when the operating point is further toward the right than the upshift instruction line, the gear position is determined to be inappropriate and the driver is instructed to perform an upshift.

Figure 11:
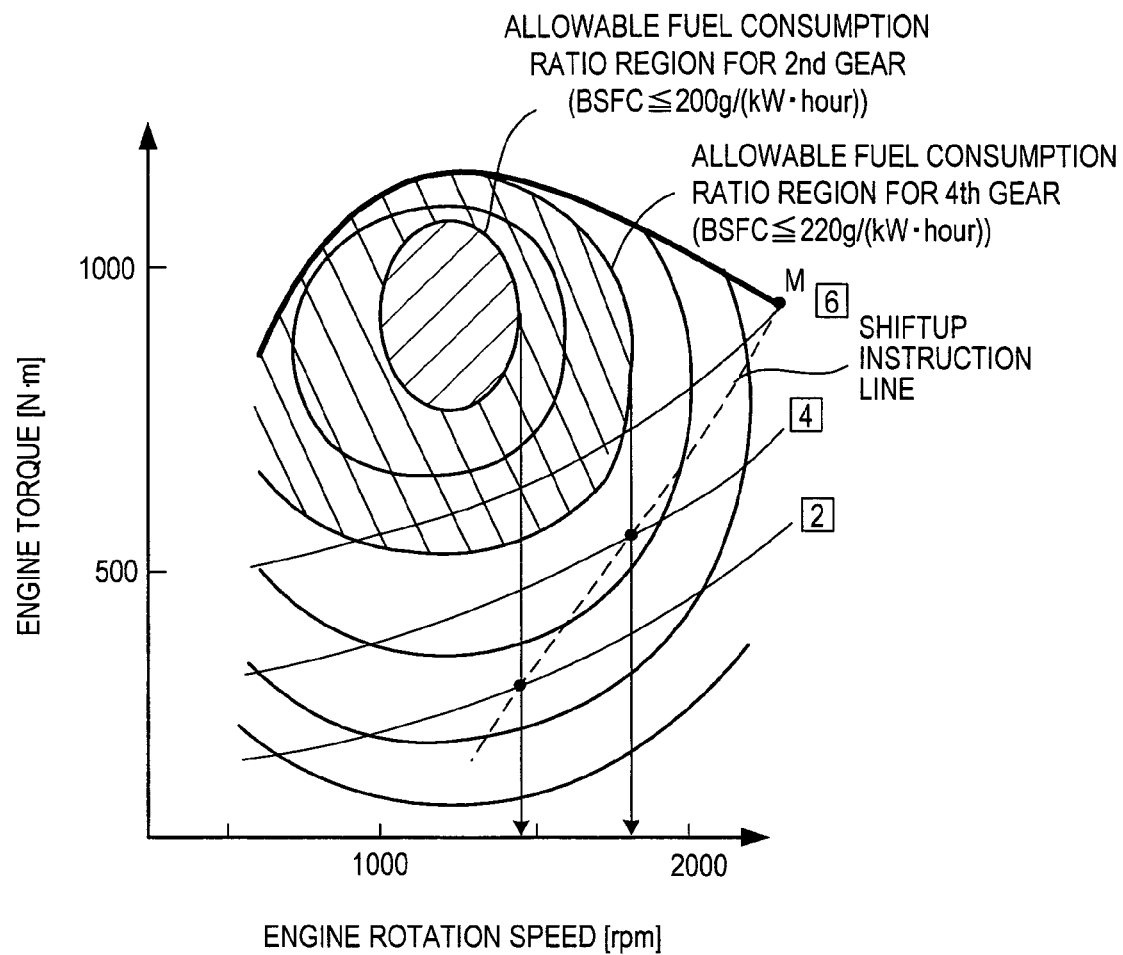
FIG. 11 is a view for illustrating a modified example of the fourth embodiment.

Alternatively, as shown in FIG. 11, an allowable fuel consumption ratio region may be set for each gear position and the maximum rotation speed in the allowable fuel consumption ratio region of each gear position may be set as the upshift instruction rotation speed.

In the example shown in FIG. 11, a region in which the fuel consumption ratio is smaller than 200 [g/(kW·hour)] is set as the allowable fuel consumption ratio region in second gear, and a region in which the fuel consumption ratio is smaller than 220 [g/(kW·hour)] is set as the allowable fuel consumption ratio region in fourth gear. The upshift instruction rotation speeds in second and fourth gear are 1400 [rpm] and 1750 [rpm] respectively.

In this case also, where an allowable fuel consumption ratio region is set for each gear position, an upshift instruction line may be set by connecting the point of intersection M between the torque line when traveling on a flat road in sixth gear and the maximum torque line to the upshift instruction rotation speed point on the torque line when traveling on a flat road of each gear position, whereby the gear position is determined to be inappropriate and the driver instructed to perform an upshift when the operating point of the engine 1 is further toward the right than the upshift instruction line. In this case, the upshift instruction line becomes a polygonal line.

Embodiments of this invention were described above. However, these embodiments merely illustrate one example of the evaluation system for vehicle operating conditions which is applied to this invention, and this invention is not limited to or by the constitution of these embodiments.

Further, the engine and transmission parameters include a large number of parameters which change with a similar characteristic thereto or are mutually convertible, and systems in which evaluation is performed by replacing the parameters used in the embodiments described above with parameters or the like which change with a similar characteristic thereto are also included within the technical scope of this invention.

For example, the accelerator operation amount and engine torque which varies according to the accelerator operation amount are used as the engine load, but a similar evaluation may be performed using the throttle opening or fuel injection pulse width as the engine load. Cases in which such alterations are implemented are also included within the technical scope of this invention.

What is claimed is:

1. An evaluation system for the operating conditions of a vehicle provided with an engine, comprising:
   a detection device which detects a load of the engine;
   a detection device which detects a rotation speed of the engine;
   a display device; and
   a controller functioning to:
      depict an operating frequency at each of the operating points of the engine, which are determined by the rotation speed and load, on a two-dimensional map on which a first axis is set as the engine rotation speed and a second axis is set as the engine load; and
      display the two-dimensional map on the display device.

2. An evaluation system for vehicle operating conditions which is applied to a vehicle provided with an engine and a manual transmission connected to the engine, comprising:
   a detection device which detects the operating conditions of the engine; and
   a controller functioning to:
      determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward, instruct a driver to shift the transmission upward when it is determined that the fuel economy of the vehicle would be improved by shifting the transmission upward, wherein the detection device which detects the operating conditions of the engine comprises a detection device which detects a load of the engine, and a detection device which detects a rotation speed of the engine, the controller comprises a fuel consumption ratio map showing the relationship of a fuel consumption ratio to the rotation speed and load of the engine, and further functions to:

calculate from the detected rotation speed and load of the engine a rotation speed and load of the engine following an upshift of the transmission;

calculate a current fuel consumption ratio of the engine from the detected rotation speed and load of the engine by referring to a fuel consumption ratio map, and calculate a fuel consumption ratio following an upshift of the transmission from the rotation speed and load of the engine following an upshift of the transmission; and instruct the driver to shift the transmission upward when the fuel consumption ratio following an upshift of the transmission is smaller than the calculated current fuel consumption ratio.

3. The system as defined in claim 2, further comprising a detection device which detects a vehicle speed of the vehicle, wherein the detection device which detects the operating conditions of the engine comprises:

the detection device which detects a load of the engine; and the detection device which detects a rotation speed of the engine, wherein the controller comprises a fuel consumption ratio map showing the relationship of the fuel consumption ratio to the rotation speed and load of the engine, and further functions to:

calculate a gear position of the transmission in which the fuel economy is most favorable when traveling on a flat road at the detected vehicle speed;

calculate a load of the engine when traveling in the gear position in which the fuel economy is most favorable; and instruct the driver to perform an upshift when the detected load of the engine is lower than the engine load when traveling in the gear position in which the fuel economy is most favorable, and when the detected rotation speed of the engine is higher by a predetermined degree or more than the maximum rotation speed of the region on the fuel consumption ratio map in which the fuel consumption ratio is smaller than a predetermined value.

4. The system as defined in claim 2, wherein the detection device which detects the operating conditions of the engine is the detection device which detects the rotation speed of the engine, and wherein the controller further functions to:

set an upshift instruction rotation speed gradually lower as the gear position of the transmission moves further toward a LOW side; and instruct the driver to shift the transmission upward when the detected rotation speed of the engine is higher than the upshift instruction rotation speed.

5. An evaluation system for vehicle operating conditions which is applied to a vehicle provided with an engine and a manual transmission connected to the engine, comprising:

a detection device which detects the operating conditions of the engine; and a controller functioning to:

determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward, wherein the detection device which detects the operating conditions of the engine comprises:

a detection device which detects a load of the engine; and a detection device which detects a rotation speed of the engine, wherein the controller comprises a fuel consumption ratio map showing the relationship of a fuel consumption ratio to the rotation speed and load of the engine, and further functions to:

set an upshift, instruction line on the fuel consumption ratio map which passes through a point of intersection between a maximum torque line of the engine and a line indicating the torque required to travel on a flat road in the gear position which is furthest toward the HIGH side, and which contacts a region in which the fuel consumption ratio is smaller than an allowable value; and instruct the driver to shift the transmission upward when an operating point of the engine, which is determined by the rotation speed and load of the engine, is further toward a high rotation speed side or a low load side than the upshift instruction line.

6. An evaluation system for vehicle operating conditions which is applied to a vehicle provided with an engine and a manual transmission connected to the engine, comprising:

a detection device which detects the operating conditions of the engine; and a controller functioning to:

determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward, wherein the detection device which detects the operating conditions of the engine is a detection device which detects a rotation speed of the engine, and wherein the controller comprises a fuel consumption ratio map showing the relationship of a fuel consumption ratio to the rotation speed and load of the engine, and further functions to:

set an upshift instruction line on the fuel consumption ratio map which passes through a point of intersection between the maximum torque line of the engine and the line indicating the torque required to travel on a flat road in the gear position which is furthest toward the HIGH side, and which contacts the region in which the fuel consumption ratio is smaller than an allowable value;

set a point of intersection between the upshift instruction line and the line indicating the torque required to travel on a flat road in each gear position as an upshift instruction rotation speed for each gear position; and instruct the driver to shift the transmission upward when the detected rotation speed of the engine is higher than the upshift instruction rotation speed in the current gear position.

7. An evaluation system for vehicle operating conditions which is applied to a vehicle provided with an engine and a manual transmission connected to the engine, comprising:

a detection device which detects the operating conditions of the engine;

a controller functioning to:

determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward; and a display device connected to the controller, wherein the detection device which detects the operating conditions of the engine comprises:

a detection device which detects a load of the engine; and a detection device which detects a rotation speed of the engine, and wherein the controller comprises a fuel consumption ratio map showing the relationship of a fuel consumption ratio to the rotation speed and load of the engine, and further functions to:

calculate the fuel consumption ratio of the engine based on the detected rotation speed and load of the engine by referring to the fuel consumption ratio map;

calculate a fuel consumption amount of the engine based on the calculated fuel consumption ratio; and display at least one of the calculated fuel consumption amount and the fuel economy which are calculated from the calculated fuel consumption amount on the display device.

8. The system as defined in claim 7, wherein the controller further functions to:

determine variation in the current fuel consumption ratio in relation to an initial fuel consumption ratio of the engine; and on the basis of the variation in the fuel consumption ratio, correct at least one of the fuel consumption ratio map, the calculated fuel consumption ratio, and the calculated fuel consumption amount.

9. An evaluation system for vehicle operating conditions which is applied to a vehicle provided with an engine and a manual transmission connected to the engine, comprising:

a detection device which detects the operating conditions of the engine; and a controller functioning to:

determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward; and a display device connected to the controller, wherein the engine is operable at a plurality of operating points, wherein the detection device which detects the operating conditions of the engine comprises:

a detection device which detects a load of the engine; and a detection device which detects a rotation speed of the engine, and wherein the controller further functions to:

depict an operating frequency at each of the operating points of the engine, which are determined by the rotation speed and load, on a two-dimensional map on which a first axis is set as the engine rotation speed and a second axis is set as the engine load; and display the two-dimensional map on the display device.

10. The system as defined in claim 9, wherein the controller further functions to depict the operating frequency on the two-dimensional map using color variation in accordance with the greatness of the frequency.

11. An evaluation system for vehicle operating conditions which is applied to a vehicle provided with an engine and a manual transmission connected to the engine, comprising:

a detection device which detects the operating conditions of the engine;

a controller functioning to:

determine, on the basis of the operating conditions of the engine, whether or not the fuel economy of the vehicle would be improved by shifting the transmission upward from the current gear position to a gear position one step further toward a HIGH side; and instruct a driver to shift the transmission upward when it is determined that the fuel economy of the vehicle would be improved by shifting the transmission upward; and a display device connected to the controller, wherein the controller further functions to:

determine whether or not a driving operation which worsens the fuel economy has been performed;

when it is determined that an operation which worsens fuel economy has been performed, respectively calculate an actual amount of consumed fuel and an amount of fuel which would have been consumed had the operation which worsens fuel economy not been performed;

calculate an amount of fuel consumed in excess due to the operation which worsens fuel economy by subtracting the amount of fuel which would have been consumed had the operation which worsens fuel economy not been performed from the actual amount of consumed fuel; and display the calculated excess fuel consumption amount on the display device.

12. An evaluation system for vehicle operating conditions used in a vehicle provided with an engine, comprising:

a detection device which detects a load of the engine;
a detection device which detects a rotation speed of the engine;
a display device; and
a controller comprising a fuel consumption ratio map which shows the relationship of the fuel consumption ratio to the rotation speed and load of the engine, and functioning to:
  calculate a fuel consumption ratio of the engine based on the detected rotation speed and load of the engine by referring to the fuel consumption ration map;
  calculate a fuel consumption amount of the engine based on the calculated fuel consumption ratio; and
  display at leas one of the calculated fuel consumption amount and the fuel economy which are calculated from the calculated fuel consumption amount on the display device,
wherein the controller further functions to:
  determine variation in the current fuel consumption ratio in relation to an initial fuel consumption ratio of the engine; and
  on the basis of the variation in the fuel consumption ratio, correct at least one of the fuel consumption ratio map, the calculated fuel consumption ratio, and the calculated fuel consumption amount.

* * * * *